Oct. 19, 1937.　　　　E. G. LANTZ　　　　2,096,641
CHEESE SLICING AND PACKING MACHINE
Filed Dec. 10, 1936　　　8 Sheets-Sheet 1

Elmer G. Lantz,
INVENTOR
BY Victor J. Evans & Co.
ATTORNEYS

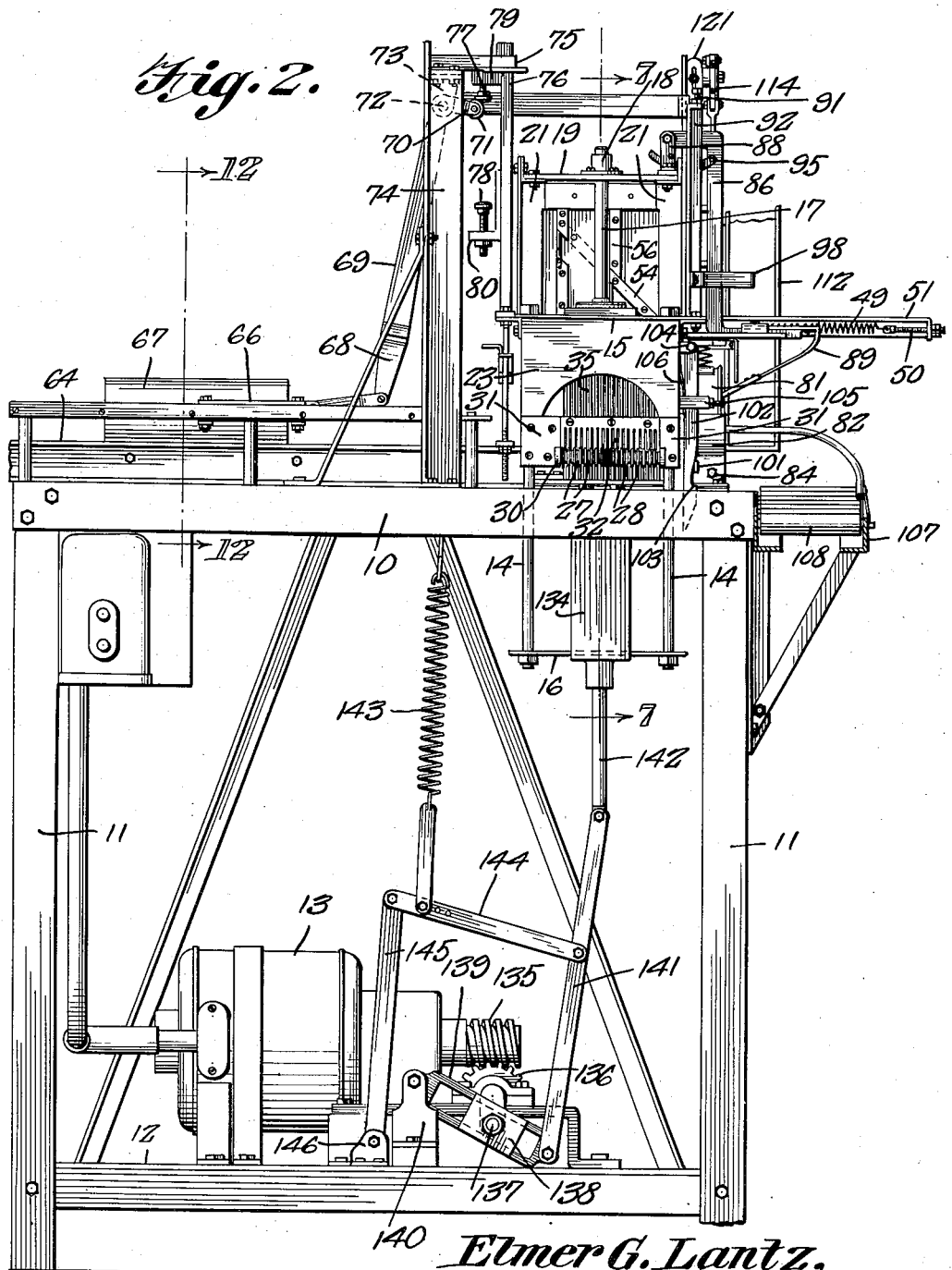

Oct. 19, 1937.  E. G. LANTZ  2,096,641
CHEESE SLICING AND PACKING MACHINE
Filed Dec. 10, 1936  8 Sheets-Sheet 3
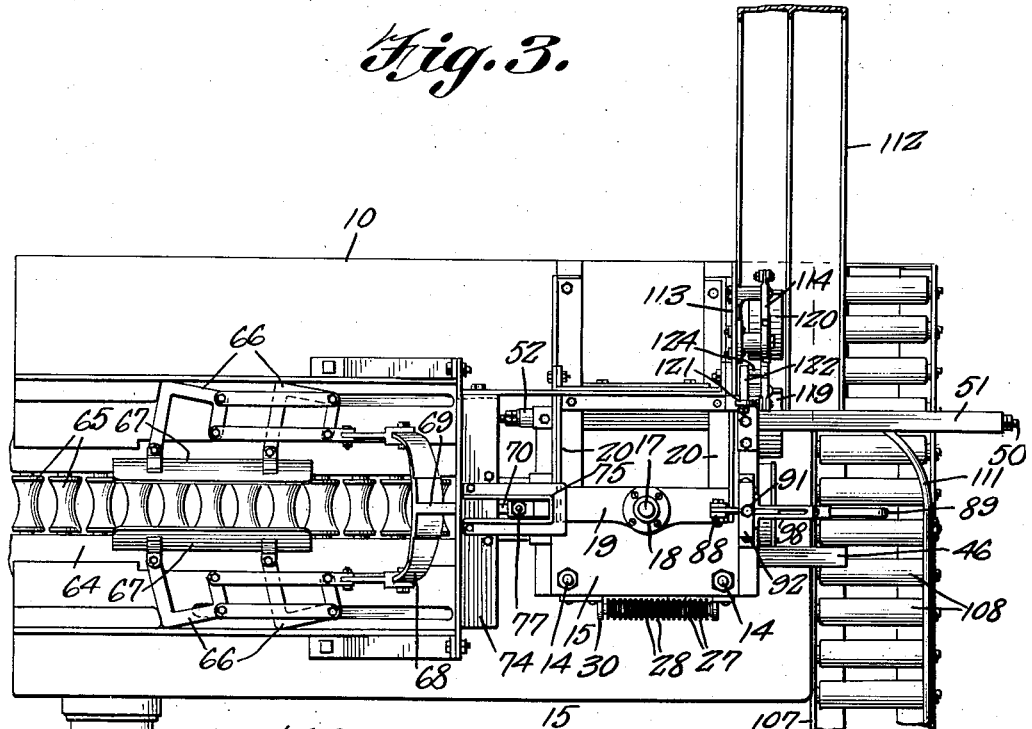
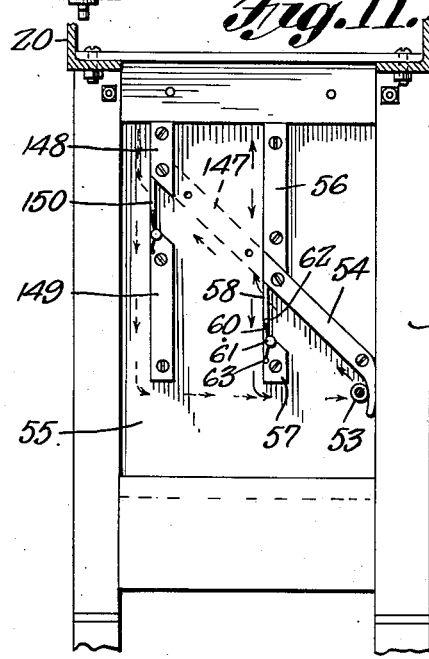
Elmer G. Lantz, INVENTOR
BY Victor J. Evans & Co.
ATTORNEYS

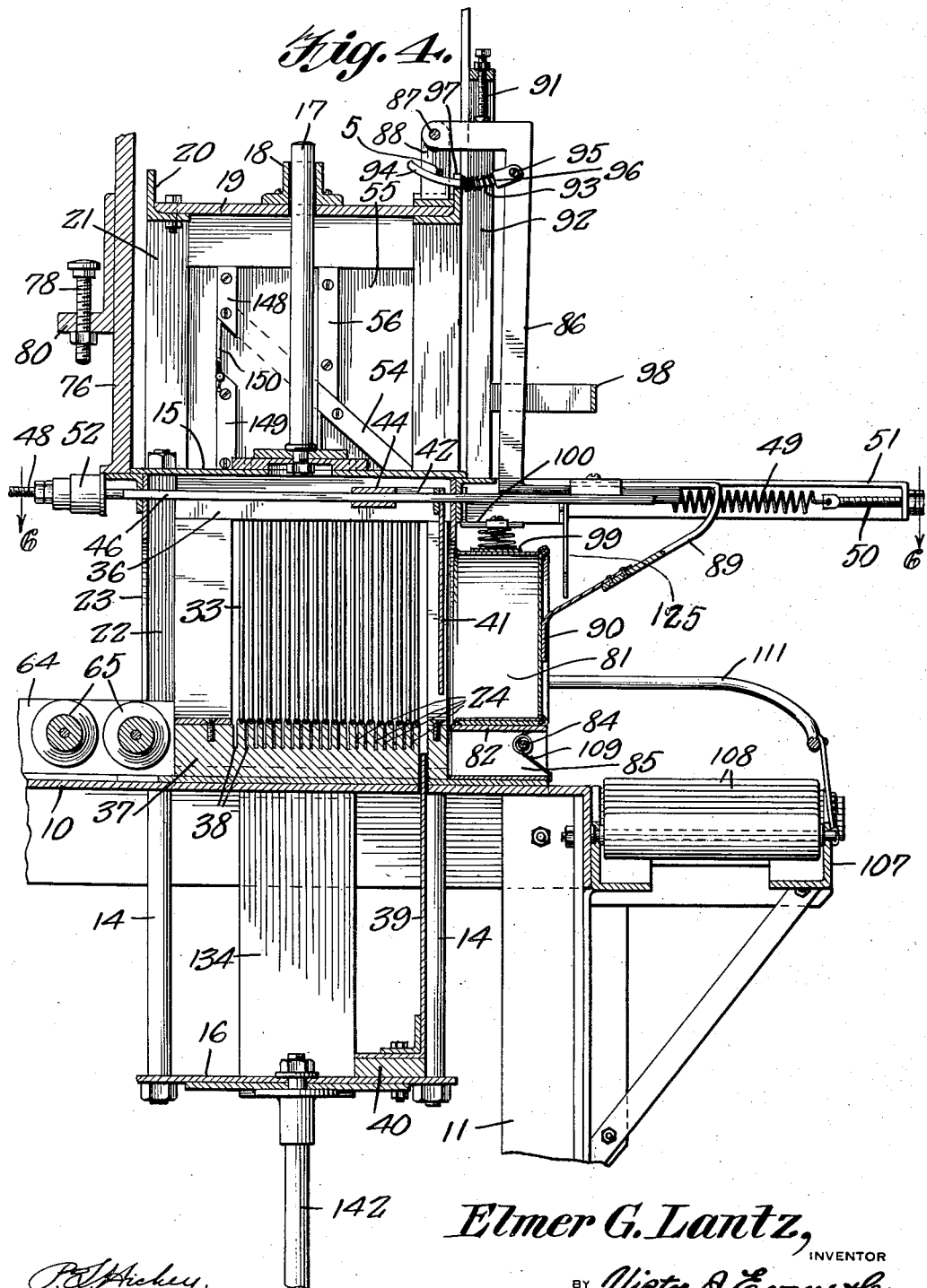

Oct. 19, 1937.  E. G. LANTZ  2,096,641
CHEESE SLICING AND PACKING MACHINE
Filed Dec. 10, 1936  8 Sheets-Sheet 5

Elmer G. Lantz,
INVENTOR

Oct. 19, 1937.  E. G. LANTZ  2,096,641
CHEESE SLICING AND PACKING MACHINE
Filed Dec. 10, 1936  8 Sheets-Sheet 6
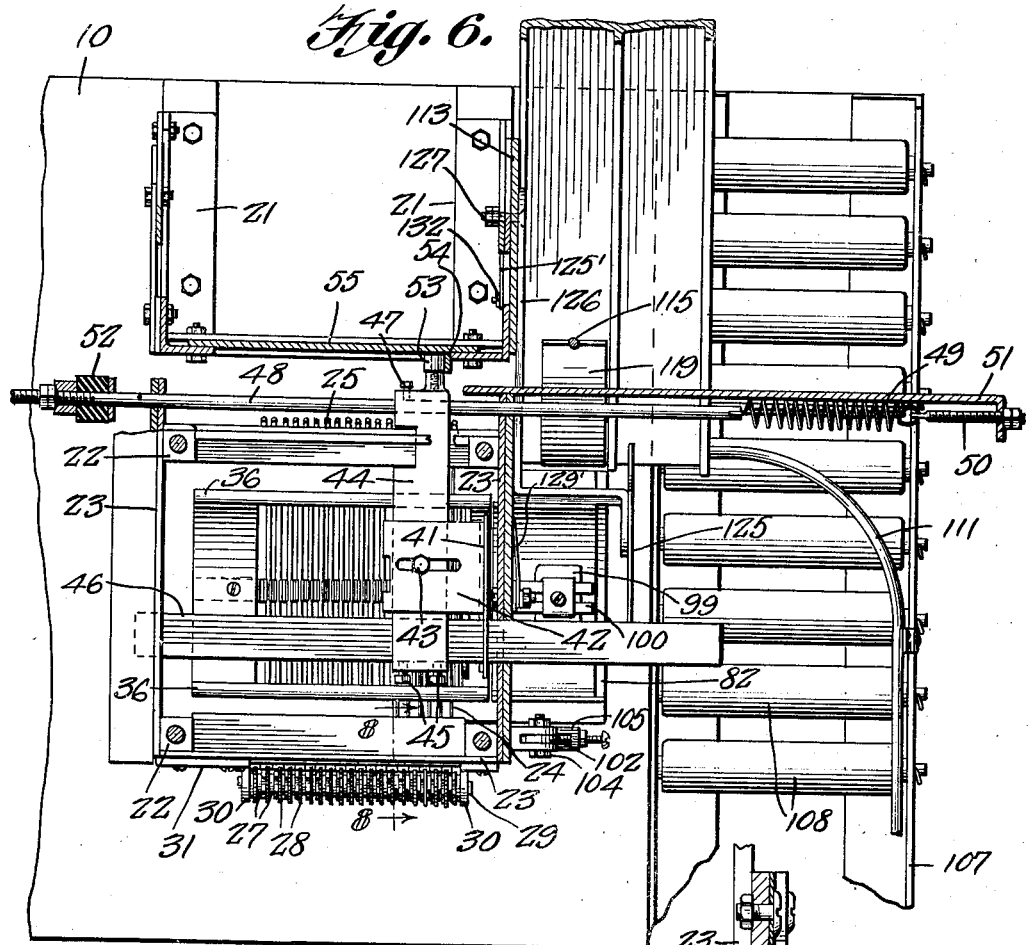
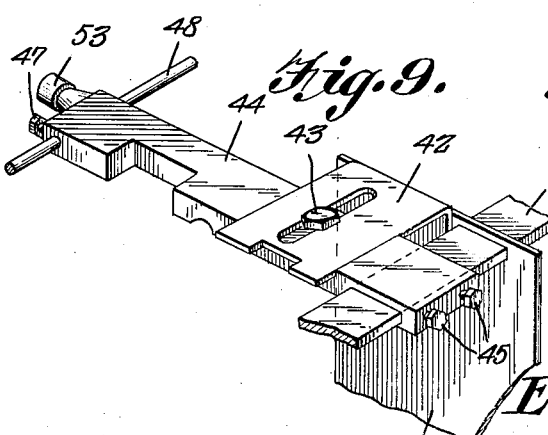
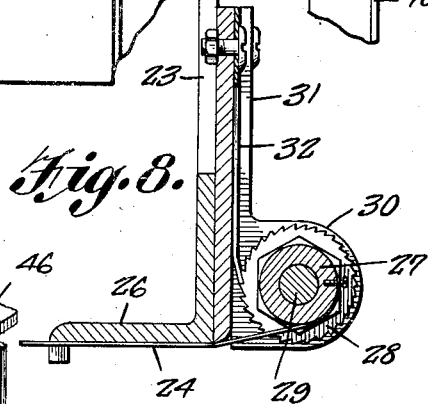
Elmer G. Lantz, INVENTOR
BY Victor J. Evans & Co.
ATTORNEYS

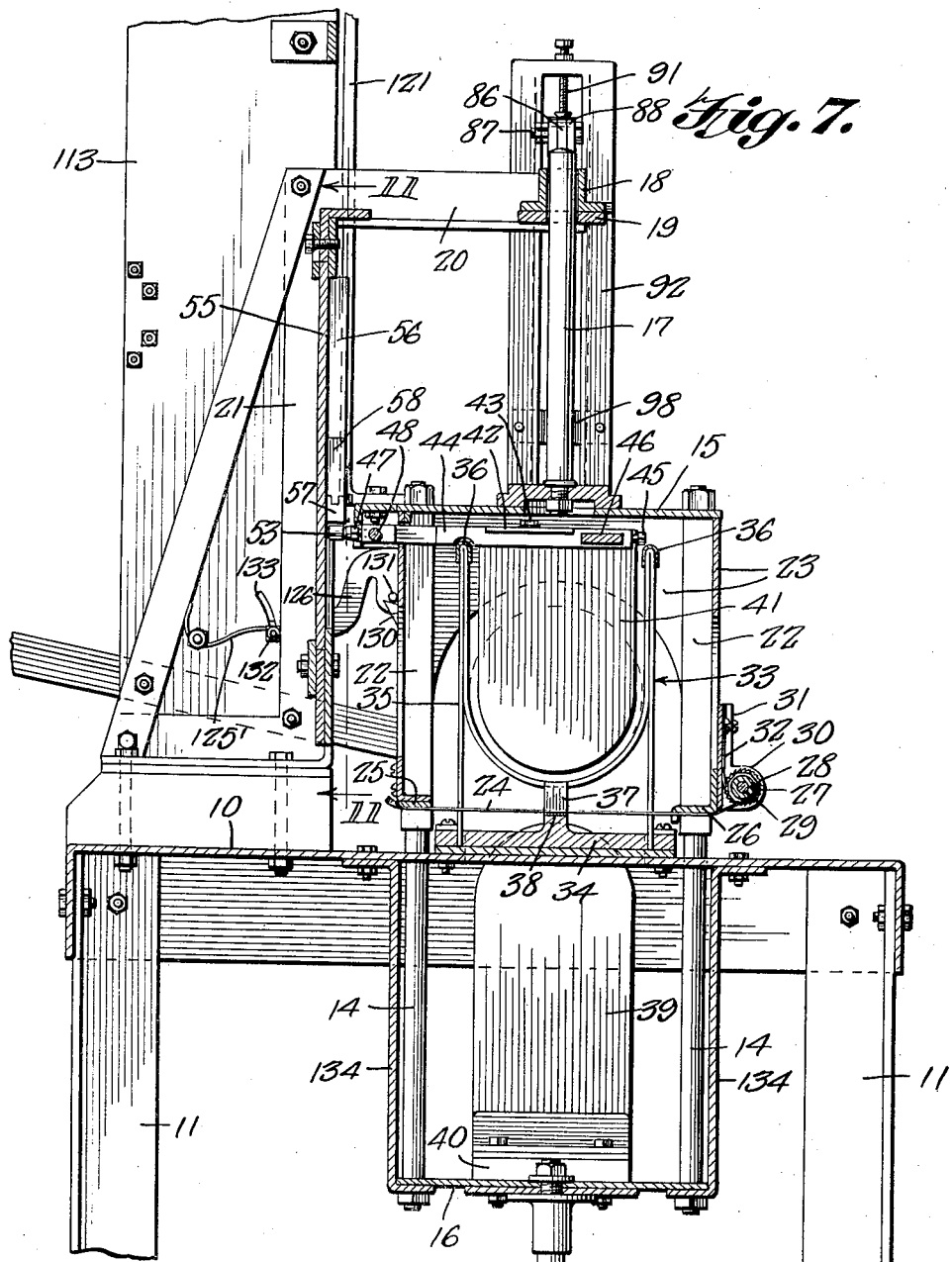

Oct. 19, 1937.  E. G. LANTZ  2,096,641
CHEESE SLICING AND PACKING MACHINE
Filed Dec. 10, 1936  8 Sheets-Sheet 8
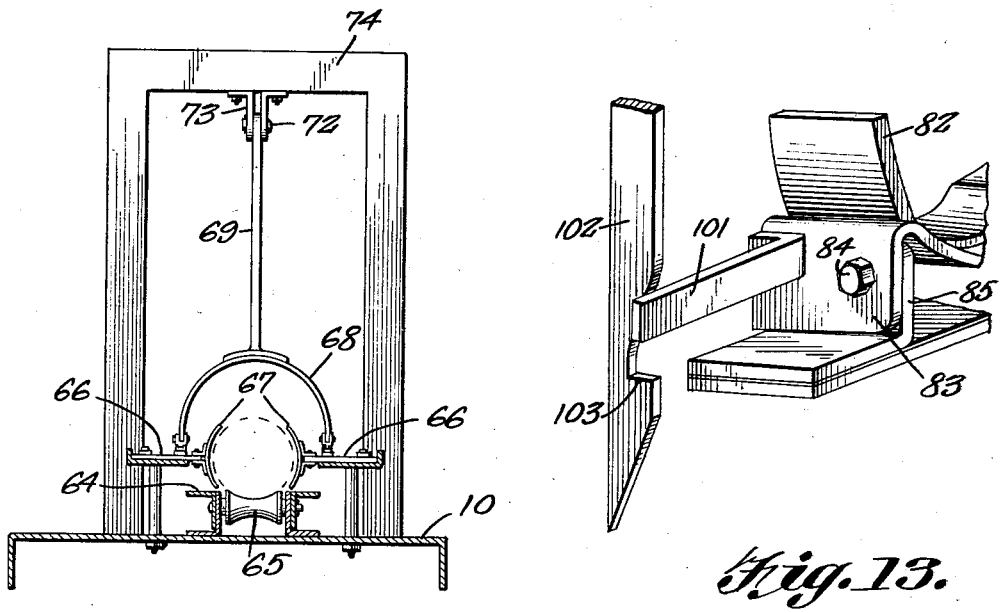
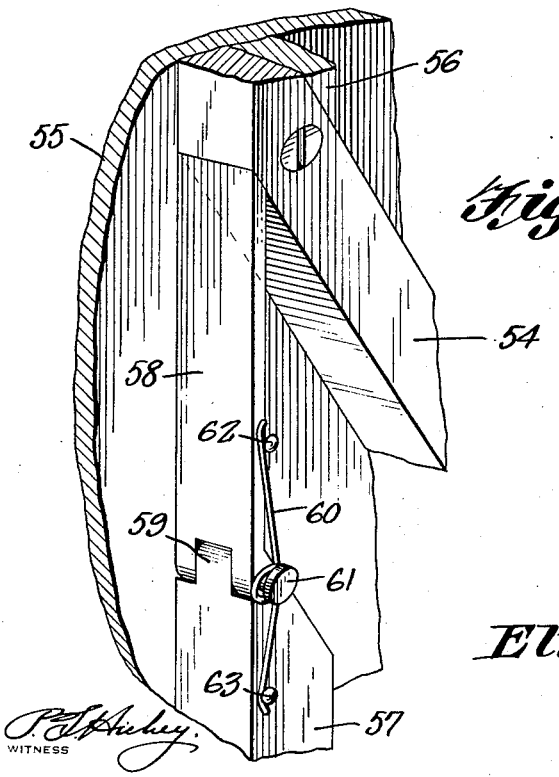
Elmer G. Lantz, INVENTOR Patented Oct. 19, 1937

2,096,641

UNITED STATES PATENT OFFICE 2,096,641

CHEESE SLICING AND PACKING MACHINE

Elmer G. Lantz, Salem, Oreg.

Application December 10, 1936, Serial No. 115,235

11 Claims. (Cl. 31—5)

This invention relates to cheese slicing and packing machines and has for an object to provide a machine of this character having novel slicing means, can releasing means, and can holding and delivering mechanism.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 2 is a side elevation of the machine.

Figure 3 is a top plan view of the machine.

Figure 4 is a vertical sectional view taken on the line 4—4 of Figure 1 and showing the slicer head at the lower limit of stroke.

Figure 6 is a horizontal sectional view taken on the line 6—6 of Figure 4 showing the carriage and pusher plate in plan.

Figure 7 is a vertical sectional view taken on the line 7—7 of Figure 2 showing the wire cheese rack and pusher plate in elevation.

Figure 8 is a detail sectional view taken on the line 8—8 of Figure 6 and showing the slicing wire tensioning device.

Figure 9 is a detail perspective view of the carriage and pusher plate.

Figure 10 is a detail elevation showing the lifting hook for the can abutment plate.

Figure 11 is a vertical section taken on the line 11—11 of Figure 7 and showing the guides for directing the rearward stroke of the carriage as the slicer head moves upward.

Figure 12 is a vertical sectional view taken on the line 12—12 of Figure 2 and showing the cheese feeding mechanism.

Figure 13 is a detail perspective view showing the tilting can support and actuating rod.

Figure 14 is a detail perspective view of one of the carriage guides and pivoted gate associated therewith.

Figure 1:
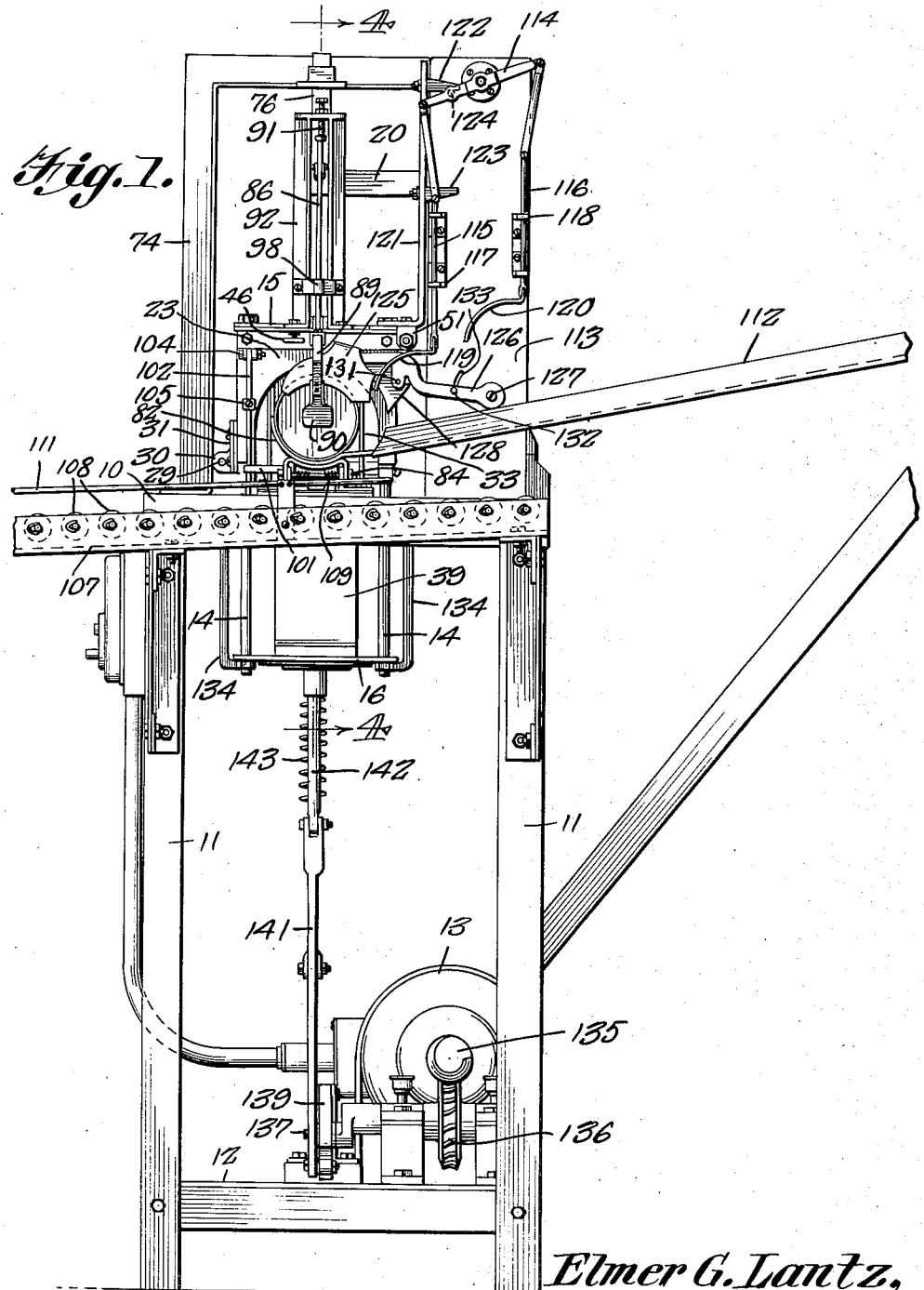
Figure 1 is a front elevation of the machine.

Referring now to the drawings in which like characters of reference designate similar parts in the various views, 10 designates a base which is supported upon legs 11. A shelf 12 below the base plate supports an electric motor 13 for reciprocating the slicer head vertically.

Slicer head

Figure 5:
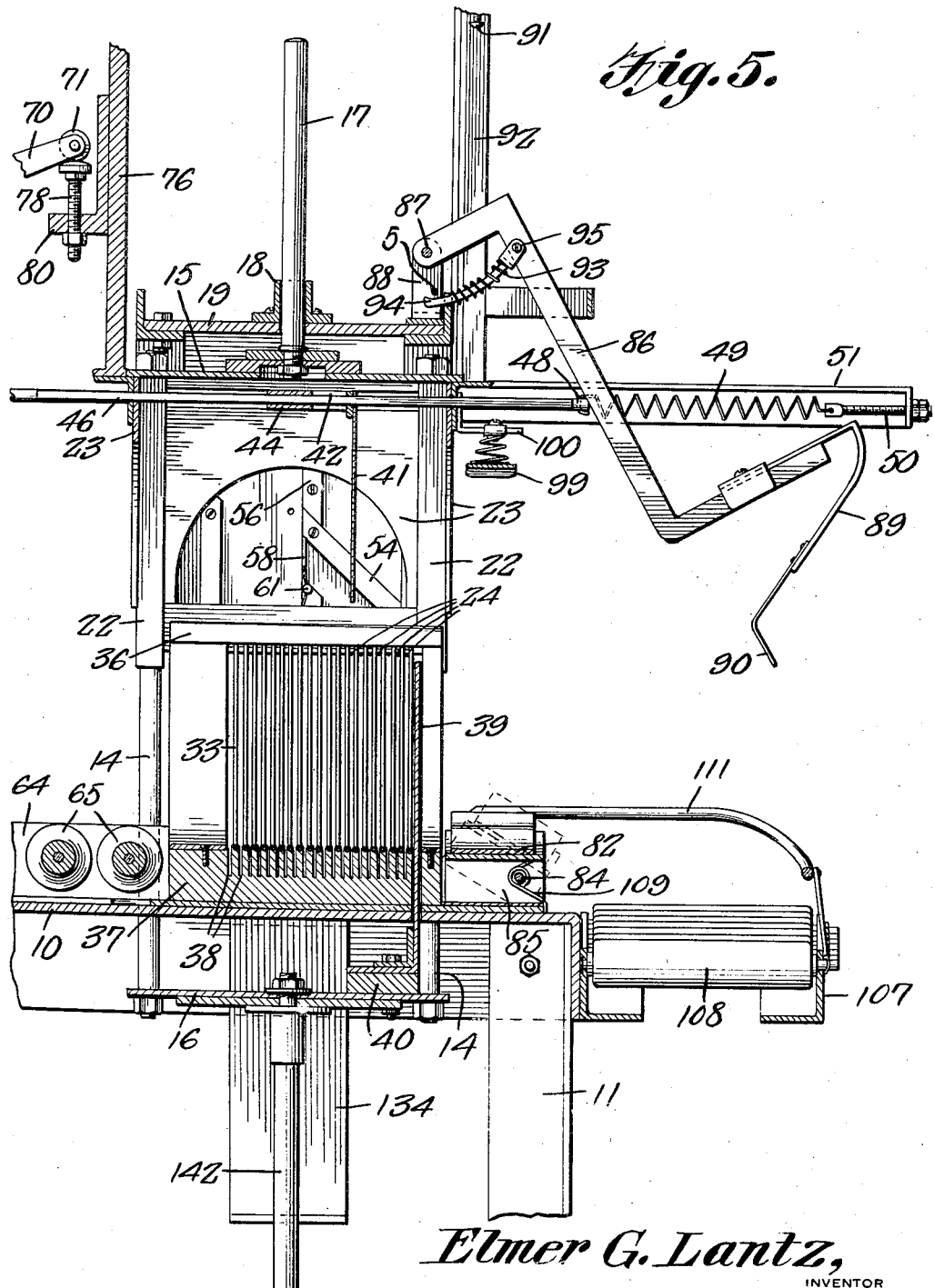
Figure 5 is a vertical sectional view similar to Figure 4 and showing the slicer head at the upper limit of stroke.

The slicer head comprises four rods 14, best shown in Figure 7, which slide vertically through suitable openings in the base plate 10, a top plate 15 and a bottom plate 16. A guide rod 17 is secured to the center of the top plate and is slidably fitted in a bearing 18 carried by an arm 19 which bridges horizontally extending frame bars 20 extending from the upper ends of standards 21 that are secured to the base plate 10, as best shown in Figures 1 and 7. The upper ends of the rods 14 are equipped with sleeves 22, best shown in Figures 6 and 7, and plates 23 are secured thereto, as best shown in Figure 5, for supporting mechanism hereinafter described.

A plurality of slicing wires 24 extend transversely of the machine and are each rigidly connected at one end to a bar 25 on one of the plates 23 as best shown in Figure 7. The other end of each wire is trained along the bottom of a bar 26 carried by the opposite plate 23, as best shown in Figure 7, and, as best shown in Figure 8, the end of the wire is secured to the hub 27 of a ratchet wheel 28 that is mounted on a shaft 29. The ends of the shaft 29 are journaled in bearings 30 on a bar 31, best shown in Figure 2, carried by the last named plate 23. A spring tongue 32 is fixed to the bar and prevents retrograde movement of the ratchet wheel as best shown in Figure 8. By advancing the ratchet wheel the associated slicing wire will be tightened.

A wire cheese rack 33 is supported upon a plate 34 that is rigidly secured to the base plate 10 of the machine as best shown in Figures 4 and 7. The rack is formed with a plurality of U-shaped wires spaced apart sufficiently to permit the slicing wires to pass vertically between them, the U-shaped wires being bent to provide vertical legs 35 which mount the bar upon the base plate. The upper ends of the U-shaped wires are connected together, on each side of the rack, by U-shaped clamps 36, as best shown in Figure 7. As best shown in Figures 5 and 7, a rib 37 on the plate 34 supports all of the U-shaped wires at the bottom, and the rib is provided with vertical slots 38 which receive the slicing wires 24 when the slicer head is at its lower limit of movement as shown in Figure 4.

A stop plate 39, of the general shape shown in Figure 7, is fixed at the lower end to a cross bar 40 that is fixed to the bottom plate 16 of the slicer head, as shown in Figure 4. The stop plate moves upwardly into the space in front of the wire cheese rack when the slicer head moves upwardly to form an abutment against which the cheese, in loaf form, is fed as will presently be described, just prior to the slicer head starting its downward stroke to carry the slicing wires through the cheese. The stop plate is withdrawn from in front of the cheese rack simultaneously with the wires severing the cheese into slices during down stroke of the slicer head. As the slicer head arrives at the lower limit of stroke the ejecting mechanism will be brought into action and eject the sliced cheese.

*Cheese ejecting mechanism*

A pusher plate 41 of the general shape shown in Figure 7, and of slightly smaller dimensions than the cheese rack, is secured at the upper end to an angular bracket 42, best shown in Figure 9. The bracket is adjustably mounted, as shown at 43, on a carriage 44. The carriage is adjustably secured at one end, as shown at 45, to a guide bar 46 which is slidably fitted in suitable openings formed in the heretofore mentioned plates 23 of the slicer head as best shown in Figures 5 and 6. The opposite end of the carriage is adjustably secured at 47 to a pull rod 48 as shown in Figure 6.

The pull rod is also slidably fitted in openings in the plates 23. A helical spring 49 is secured to the leading end of the pull rod and to an adjusting screw 50 carried by an arm 51 which projects forwardly from the slicer head, as best shown in Figures 4 and 6. The opposite end of the pull rod is equipped with a bumper 52. The spring is expanded during movement of the carriage to its rear limit of stroke and contracts to suddenly pull the carriage and pusher plate 41 forwardly to eject the sliced cheese as will presently be described more fully.

The carriage 44 is equipped with a roller 53, best shown in Figures 6 and 9, and this roller, when the slicer head moves upwardly, rides upon the lower edge of an upwardly inclined guide bar 54, best shown in Figures 4, 7 and 11. Thus the carriage is moved rearwardly during upstroke of the slicer head.

The guide bar 54 is mounted upon a vertical plate 55 carried by the standards 21, as best shown in Figures 4 and 7. A vertically disposed guide bar 56 is mounted on the plate and extends to the upper end of the inclined guide bar 54. A short vertically disposed guide bar 57, best shown in Figure 11, is fixed to the plate in alignment with the vertically disposed guide bar 56 and is positioned below the inclined guide bar 54. A gate 58 is hinged to the short lower guide bar 57, as shown at 59 in Figure 14, and a spring 60 is sleeved upon the pivot pin 61 of the gate and has its ends bearing upon pins 62 and 63 carried by the gate and the lower short guide rod respectively to normally hold the gate closed against the inclined guide bar 54.

When the roller 53 rides upwardly upon the inclined guide bar 54 during upstroke of the slicer head, the pusher plate 41 is raised vertically out of the wire cheese rack 33, and at the same time is moved rearwardly a distance corresponding to the distance between the lower end of the inclined guide bar 54 and the lower vertical guide bar 57, shown in Figure 11. When the roller arrives at the gate 58 it pushes the gate open and rides vertically along the rear face of the guide bar 56 as indicated by the arrowhead. When the slicer head arrives at its limit of stroke and starts downward the roller moves downward with it and passes over the closed gate 58 to the lower end of the short guide bar 57. At about this moment the slicer head has arrived at its lower limit of stroke and has placed the pusher plate 41 in rear of the last slice of cheese cut by down stroke of the slicer head. Simultaneously therewith the roller 53 has advanced beyond the lower end of the short guide bar 57 and at this moment the spring 49, being no longer held under tension, contracts sharply and moves the carriage and pusher plate quickly forward to eject the sliced cheese from the cheese rack.

To provide for large size cans being utilized, it will be seen by referring to Figures 4 and 11 that the length of the stroke of the pusher plate may be increased by providing an inclined guide bar 147 which is fixed to the plate 55 in alignment with the inclined guide bar 54. Figure 11 shows the bar 147 removed, but its position, when used, is indicated by broken lines. Vertically disposed guide bars 148 and 149 are secured to the plate parallel with the similar guide bars 56 and 57 and in rear thereof. A spring pressed gate 150 similar to the gate 58, closes the gap between the guide bars 148 and 149. The roller 53 of the carriage 44 travels up the guide bar 54, through the gate 58, up the guide bar 147, and it reaches the rear face of the vertical guide bar 148. Thus the pusher plate operated by the carriage is carried back a greater distance than ordinarily. The roller 53 rides down the guide bars 148 and 149 during downward movement of the slicer head and then rides off of the guide bar to permit the carriage to be moved forward by its controlling spring 49 as previously described.

*Cheese feeding mechanism*

The cheese feeding mechanism is best shown in Figures 2, 3 and 12. A feed trough 64 is disposed longitudinally on the base and is provided with a plurality of rollers 65 which support the cheese, in cylindrical loaf form, so that it may be easily slid forward into the cheese rack. Arranged on opposite sides of the trough are toggle knees 66 which are equipped with opposed arcuate sheet metal jaws 67 adapted to grip the cheese on opposite sides thereof, as best shown in Figure 12. The toggle knees are connected together at their forward ends by a yoke 68 which is fixed to the lower end of a lever 69 that extends obliquely upward as best shown in Figure 2. The lever is provided with an angularly disposed finger 70 which is equipped with a roller 71. The lever is pivoted as shown at 72 to a pair of ears 73 which depend from the transverse member of an inverted U-shaped frame 74, best shown in Figure 12. As shown in Figure 3, a guide bracket 75 projects forwardly from the transverse member of the frame.

A trip rod 76 is fixed at the lower end to the top of an angle bar which is secured to plate 23 of the slicer head and extends vertically upward through the guide bracket 75 as best shown in Figures 2, 4 and 5. The trip rod is provided with spaced screws 77 and 78 carried respectively by laterally directed lugs 79 and 80. The roller 71 of the feeding lever 69 projects into the path of these screws so that as the trip rod moves upwardly during upstroke of the slicer head the lower screw 78 will strike the roller 71 and rock the lever 69 on its pivot. When the trip rod moves downwardly during down stroke of the slicer head the upper screw 77 will strike the roller 71 and again rock the feeding lever 69 on its pivot.

When the slicer head arrives at its lower limit of stroke the feeding lever will be rocked by the screw 77 in a direction to first actuate the toggle knees 66, which are parallel link motion mechanisms, to open the jaws 67 to disengage from the cheese, and then move the jaws bodily rearward into position to again grasp the cheese. When the slicer head arrives at its upper limit of stroke, at which time the stop plate 39 is in operative position in front of the cheese rack as shown best in Figure 5, the lower screw 78 will rock the lever 69 in a direction to first operate the toggle knees 66 to cause the jaws 67 to grasp the cheese and then carry the cheese forwardly until it abuts the stop plate. At this time a fresh portion of the cheese is in position in the cheese rack to be sliced by the wires 24 during down stroke of the slicer head. At the end of the downstroke of the slicer head the sliced cheese is ejected by forward movement of the pusher plate 41 and packed in a can 81, shown best in Figure 4, held in front of the cheese rack by a can holding mechanism.

*Can holding mechanism*

As best shown in Figures 4, 5 and 13, an arcuate support 82 is provided with an ear 83 which is pivoted as shown at 84, near one corner, to a bracket 85 that rises from the base 10 in position to dispose the support 82 so that the can will be supported on its side with its open end confronting the end of the cheese in the cheese rack to receive the sliced cheese ejected by the pusher plate 41.

For holding the can stationary as the cheese is being pushed into it, a substantially Z-shaped lever 86, best shown in Figures 4 and 5, is pivoted at its upper end, as shown at 87, to a bracket 88 which rises from the stationary arm 19 above the slicer head. The lower end of the lever is equipped with a reversely directed arm 89 which terminates in a foot 90 adapted to engage the bottom of the can 81, as best shown in Figure 4.

A screw 91, carried by the transverse member of an inverted U-shaped bracket 92, engages the top of the Z-shaped lever 86 to firmly hold the foot 90 stationary against the can while the pusher plate 41 is ejecting the sliced cheese from the cheese rack forwardly into the can, at the time the slicer head is at its lower limit of stroke. When the slicer head travels to its upper limit of stroke the bracket 92 will be carried upwardly as a unit therewith thereby removing the screw 91 from engagement with the Z-shaped lever 86. Thereupon the Z-shaped lever is swung outwardly to the position shown in Figure 5 by a spring 93 which is sleeved on an arcuate push rod 94 that is pivoted at one end as shown at 95 to the Z-shaped lever. The spring is confined under tension between a stop 96 on the lever and a stop 97 on the top plate 19 of the slicer head when the Z-shaped lever is in its operative position and expands sharply to swing the Z-shaped lever to its can releasing position the moment the screw 91 recedes from the lever during the upstroke of the slicer head. The arcuate rod bears against a guide pin 5 on the bracket 88. A U-shaped bracket 98, carried by the bracket 92 straddles the Z-shaped lever 86 and limits releasing movement of the latter under action of the spring 93.

A presser foot 99, shown best in Figures 4, 5 and 6, is adjustably mounted on a slotted bracket 100 carried by one side plate 23 of the slicer head. The presser foot engages the top side of the can 81 and clamps the can to the bottom can support 82 when the slicer head is at its lower limit of movement. When the slicer head moves upwardly the foot moves upwardly as a unit with it and is withdrawn from the can. At the same time the lever 86 releases the foot 90 from the can so that the filled can may be ejected by the can ejecting mechanism.

*Can ejecting mechanism*

To eject a filled can the bottom can support 82, shown best in Figures 4, 5 and 13, is tilted to the dotted line position shown in Figure 5. For this purpose a finger 101 projects from the ear 83 as shown in Figure 13, into the path of movement of a vertically movable rod 102, shown best in Figure 2, having a hook 103 at the bottom adapted to engage underneath the finger 101 when the slicer head is at its lowest limit of movement. As shown in Figures 1 and 2, the rod 102 is pivoted at the upper end as shown at 104 on the front plate 23 of the slicer head and as best shown in Figures 2 and 6 extends downwardly through a U-shaped guide 105 that is also mounted on the plate 23. A leaf spring 106 is disposed underneath the rear edge of the rod 102 and holds the rod yieldably at its outward limit of pivotal movement in the guide so that when the slicer head moves down the rod will yield rearwardly to pass over the finger 101 until the hook 103 lodges underneath the finger.

The rod 102 is carried upwardly as a unit with the slicer head and lifts the finger 101 to tilt the lower can support 82 on its pivot 84, as shown by dotted lines in Figure 5, and eject the filled can from the machine on to a downwardly inclined trough 107, shown best in Figure 1. The trough is provided with cylindrical rollers 108 and due to the slope of the trough each can will ride down the delivery end thereof when ejected from the machine.

The lower can support 82 is returned to operative position after each actuation by a helical spring 109, shown in Figure 1, this spring being sleeved upon the pivot 84 and having its opposite ends bearing against the plate 10 and against the underneath surface of the can support 82, respectively as best shown in Figures 4 and 5. When the support is tilted as just described the spring will be tensioned and will expand and tilt the plate back to normal position as soon as the can is ejected.

A guide rod 111, shown best in Figures 3 and 6, has one end secured in any suitable manner to the base 10 and guides the filled can onto the roller conveyor 107 as the can is being ejected from the machine.

*Can feeding mechanism*

The cans are stored in and gravitate down an inclined trough 112, shown best in Figure 1. At the delivery end of the trough a plate 113 rises from the base 10 and is equipped at the top with a walking beam 114. Links 115 and 116 are pivotally connected to the ends of the walking beam and are supported for vertical movement on the plate by guides 117 and 118. The lower ends of the links are provided with curved can engaging clamps 119 and 120.

A trip bar 121 rises from the top plate 15 of the slicer head and is provided with two laterally extending fingers 122 and 123 adapted to alternately engage a pin 124 on one end of the walking beam 114 and tilt the walking beam to move the can engaging clamps. When the slicer head moves upwardly the lower finger 123 will engage the pin 124 and move the walking beam 114 to raise the clamp 119 and lower the clamp 120 so that the initial can may escape on to the lower can support 82. At the same time the clamp 120 will be lowered to engage the next succeeding can and hold it stationary. Upon the down stroke of the slicer head the finger 122 will engage the pin 124 and move the walking beam to raise the clamp 120 to release the can underneath it and at the same time lower the clamp 119 to clamp the can stationary until needed. When the can is freed to drop on to the can support 82 the can is guided into proper position by guiding mechanism.

Can guiding mechanism

By referring now to Figure 1 it will be seen that a guide plate 125 is mounted on an arm 126, shown best in Figure 6, which is pivoted as shown at 127 on the plate 113, and swings in a vertical plane to project downwardly across the delivery opening of the slicer head at a distance from the slicer head slightly greater than the depth of the can as shown best in Figure 4. In this position of the guide plate a can released by the clamp 119 will be held against tilting and will be guided accurately by the guide plate 125 into position on the lower can support 82. The lever 126 may also be rocked upwardly to raise the guide plate 125 sufficiently to permit a filled can to be ejected without obstruction from the machine.

Movement of the lever 126 is controlled by a catch 128 which is pivoted at its upper end as shown at 129, Figure 10, to the slicer head and moves as a unit with the slicer head. The catch is provided at the lower end with a tooth 130 which engages underneath a pin 131 projecting from the lever 126 when the slicer head is at the lower limit of stroke. As the slicer head moves upwardly the tooth 130 carries the pin 131 upwardly and rocks the lever 126 upwardly until a pin 132, carried by the lever, see Figure 1, arrives at its upper limit of movement in an arcuate slot 133, formed in the plate 113. The ejection of a filled can having taken place just before the pin 132 arrives at the upper end of the slot 133 the guide plate 125 may now be permitted to gravitate, being accelerated by a spring 125' on the plate 113, see Figure 7.

This is accomplished by the catch 128 yielding rearwardly against the pressure of its controlling spring 129, best shown in Figure 10 to disengage from the pin 131, the guide lever immediately gravitating when this occurs and moving the guide plate 125 into operative position to guide an empty can on to the can support 82.

By referring to Figures 1, 2, 4 and 5 it will be seen that the slicer head is limited in downward movement by stop plates 134 which engage underneath the bottom plate 16 of the slicer head and limit down stroke of the slicer head.

Driving mechanism

Figures 1 and 2 also illustrate the driving mechanism.

For operating the machine the shaft of the electric motor 13 is equipped with a worm 135 which engages a worm pinion 136 having a crank 137 which moves a cross head 138 in a rock link 139 that is pivoted at one end to a bracket 140 on the shelf 12. The opposite end of the link is connected by a connecting link 141 to a rod 142 which depends from the center of the bottom plate 16 of the slicer head.

A helical spring 143 is connected to the base 10 at the upper end and the lower end is connected to a cross link 144 which is pivoted to the link 141 and is also pivoted to a rock link 145 which is pivoted at the bottom to a bracket 146 on the shelf 12.

Operation

Briefly, during upstroke of the slicer head, the jaws 67, see Figure 2, will grip the cheese and feed it into the cheese rack against the stop plate 39, see Figure 5. During the succeeding down stroke of the slicer head the wires 24 will be moved through the cheese and lodge in the grooves 38, see Figure 4. Meanwhile the pusher plate 41 has moved downward into position behind the last slice and as the slicer head arrives at its bottom limit of stroke the pusher head is moved abruptly forward to move the sliced portion of the cheese out of the machine and into the waiting can 90. The can is held stationary while it is being filled and upon the slicer head again rising the can is released by withdrawal of the lever 86, see Figure 5, whereupon it is tilted out of the machine by rocking movement of the bottom can support 82.

From the above description it is thought that the construction and operation of the invention will be fully understood without further explanation.

What is claimed is:

1. A cheese slicing and packing machine including a base, a slicer head on the base, means for reciprocating the slicer head vertically, a cheese rack on the base, slicing wires carried by the slicer head and movable through the cheese rack, a stop plate carried by the slicer head and movable into position in front of the cheese rack, cheese feeding means operated by the slicer head and adapted to feed cheese intermittently against the stop plate, can supporting means on the base in front of the cheese rack, and means operated by the slicer head and adapted to eject sliced cheese from the rack toward the can supporting means for packing the sliced cheese in cans.

2. A cheese slicing and packing machine including a base, a slicer head on the base, means for reciprocating the slicer head vertically, a cheese rack on the base, slicing wires carried by the slicer head and movable through the cheese rack, means for feeding cheese intermittently through the cheese rack into position to be sliced, a pusher plate movable through the cheese rack for ejecting sliced cheese, a carriage carried by the slicer head and supporting the pusher plate, cam means for moving the carriage and pusher plate rearwardly and upwardly during upstroke of the slicer head, a spring for moving the carriage and pusher plate as a unit forwardly at the end of down stroke of the slicer head to eject sliced cheese from the cheese rack, and can supporting means on the base in front of the cheese rack.

3. A cheese slicing and packing machine including a base, a vertically movable slicer head on the base, a cheese rack on the base, means for moving cheese in the rack into position to be intercepted and sliced by the slicer head, means for ejecting sliced cheese from the cheese rack, a tiltable support on the base in front of the cheese rack for supporting a can to be filled, means for holding the can to resist pressure of the cheese during movement thereof by the ejecting means, means for releasing the holding means, and means for tilting the can support after release of the holding means to eject a filled can from the machine.

4. A cheese slicing and packing machine including a base, a reciprocating slicer head on the base, a cheese rack on the base, a stop plate carried by the slicer head, cheese gripping jaws for feeding the cheese through the rack and against the stop plate, toggle knees for operating the jaws, a pivoted feeding lever supported by the base and connected to the toggle knees, a trip rod carried by the slicer head, spaced projections on the trip rod alternately rocking the feeding lever for moving the jaws longitudinally on the base through feeding and retrograde strokes, means adapted to eject sliced cheese from the rack, and can supporting means on the base in front of the cheese rack for supporting a can to be filled during the ejecting stroke of the ejecting means.

5. A cheese slicing and packing machine including a base, a vertically movable slicer head on the base, a cheese rack on the base, means for feeding cheese into the rack to be intercepted and sliced by the slicer head, can supporting means on the base in front of the cheese rack, means connected to the slicer head and adapted to eject sliced cheese from the rack toward the can supporting means for packing sliced cheese in cans, an inclined can trough supported by the base laterally of the can supporting means, a pair of arcuate can clamps, a walking beam supported by the base having its ends connected to respective ones of the clamps, and means carried by the slicer head for rocking the walking beam to simultaneously lift one clamp and lower the other clamp whereby to release a can from the trough on to the can supporting means and clamp the next succeeding can stationary on the trough.

6. A cheese slicing and packing machine including a base, a vertically reciprocating slicer head on the base, a cheese rack on the base, means for feeding cheese through the cheese rack into position to be sliced, a pusher plate in the cheese rack movable longitudinally through the cheese rack for ejecting sliced cheese, a carriage for the pusher plate carried by the slicer head, a roller on the carriage, a stationary upwardly inclined guide bar in rear of the slicer head, said roller riding up on the guide bar during upstroke of the slicer head and moving the pusher plate upwardly and rearwardly out of the cheese rack, a vertically disposed guide bar on the rack upon which the roller rides after leaving the inclined guide bar for disposing the pusher plate behind the slices of cheese, and a spring connected to the carriage and adapted to move the carriage and pusher plate as a unit forwardly after the roller leaves the vertical guide bar to eject sliced cheese from the cheese rack.

7. In a cheese slicing machine, a base, a vertically reciprocating slicer head on the base, a cheese rack on the base for holding cheese in position to be sliced during down stroke of the slicer head, a pusher plate for ejecting sliced cheese from the rack, a carriage for the pusher plate carried by the slicer head, a stationary upwardly inclined guide bar in rear of the slicer head, a stationary vertically disposed guide bar in rear of the inclined guide bar, a spring pressed hinged gate closing a gap between the vertically disposed guide bar and the upper end of the inclined guide bar, the carriage riding up upon the inclined guide bar and through the gate during upstroke of the slicer head to raise the pusher plate and move it rearwardly, the carriage riding down the closed gate and down the vertical guide bar during down stroke of the slicer head to position the pusher plate in rear of the slices of cheese, and means connected to the carriage adapted to move the carriage and pusher plate as a unit forwardly after the carriage leaves the vertically disposed guide bar to eject sliced cheese from the cheese rack.

8. A cheese slicing and packing machine including a base, a vertically reciprocating slicer head on the base, a cheese rack on the base for holding cheese in position to be intercepted and sliced by the slicer head, means for ejecting sliced cheese from the cheese rack, means on the base for supporting a can in position to receive the sliced cheese, a lever pivotally supported at the upper end above the slicer head to swing toward and away from the can supporting means, means on the lower end of the lever adapted to engage the bottom of a can when supported upon its side on the can supporting means and hold the can stationary to resist pressure of the sliced cheese during movement thereof by the ejecting means, a stop carried by the slicer head above said lever movable by the slicer head into and out of engagement with the lever, said stop when engaging the lever holding the lever in operative position, said stop when out of engagement with the lever releasing the lever, and means for ejecting a filled can from the can supporting means after the lever has been released.

9. A cheese slicing and packing machine including a base, a slicer head on the base, means for reciprocating the slicer head, a cheese rack formed of spaced substantially U-shaped wires having legs fixed to the base, slicing wires carried by the slicer head and movable through the spaces between the wires of the cheese rack, tensioning means for the wires on the slicer head, a rib on the base having grooves receiving the slicing wires at the lower limit of movement of the slicer head, cheese feeding means operated by the slicer head and adapted to feed cheese into the rack in position to be intercepted and sliced by the slicing wires, and means operated by the slicer head and adapted to eject sliced cheese from the cheese rack.

10. A cheese slicing and packing machine including a base, a vertically movable slicer head on the base, a cheese rack on the base, means for moving cheese in the rack into position to be intercepted and sliced by the slicer head, means for ejecting sliced cheese from the cheese rack, a can support pivoted on the base in front of the cheese rack for supporting a can to be filled, a pin on the can support for tilting the can support to eject a can filled with sliced cheese by movement of the ejecting means, a bar carried by the slicer head and having a hook engageable underneath said pin to tilt the can support upon upward movement of the slicer head, means for releasing the bar from the pin when the can support has been tilted, a spring for returning the can support to operative position after each actuation, and releasable means for holding a can stationary on the support while the can is being filled.

11. A cheese slicing and packing machine including a base, a reciprocating slicer head on the base, a cheese rack on the base, means for feeding cheese into the rack to be intercepted and sliced by the slicer head, can supporting means on the base in front of the cheese rack, means operated by the slicer head and adapted to eject sliced cheese from the rack toward the can supporting means for packing the sliced cheese in cans, a can trough supported by the base laterally of the can supporting means, a lever pivotally mounted above the can trough, a guide plate on the end of the lever adapted to guide an empty can from the trough into filling position on the can support, a pin projecting from the lever, a catch pivoted on the slicer head and adapted to engage the pin and rock the lever to move the guide plate to unobstructing position from in rear of a filled can ready to be ejected, a spring for yieldably holding the catch in operative position, and stop means for limiting upward movement of the lever and adapted to trip the catch and release it from the lever whereby the lever may move downward to dispose the guide plate in operative position after each actuation.

ELMER G. LANTZ.